(12) United States Patent
Kojima

(10) Patent No.: US 7,204,601 B2
(45) Date of Patent: Apr. 17, 2007

(54) ILLUMINATION APPARATUS AND IMAGE-TAKING APPARATUS

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 11/004,447

(22) Filed: Dec. 3, 2004

(65) Prior Publication Data

US 2005/0128300 A1    Jun. 16, 2005

(30) Foreign Application Priority Data

Dec. 12, 2003   (JP) .............................. 2003-415298

(51) Int. Cl.
  *G03B 15/02* (2006.01)
(52) U.S. Cl. ................... 362/16; 362/328; 396/155
(58) Field of Classification Search .................. 362/16, 362/17, 18, 328; 396/176, 177, 155
See application file for complete search history.

(56) References Cited

U.S. PATENT DOCUMENTS

| 5,539,622 | A | * | 7/1996 | Ishikawa | ...................... 362/16 |
| 6,078,752 | A | * | 6/2000 | Tenmyo | ....................... 396/176 |
| 2002/0186972 | A1 | | 12/2002 | Tenmyo | |
| 2004/0170008 | A1 | | 9/2004 | Tenmyo | |

FOREIGN PATENT DOCUMENTS

| JP | 2000-250102 | 9/2000 |
| JP | 2003-287792 | 10/2003 |

* cited by examiner

*Primary Examiner*—John Anthony Ward
(74) *Attorney, Agent, or Firm*—Cowan, Liebowitz & Latman, P.C

(57) ABSTRACT

An illumination apparatus is disclosed, with which an illumination optical system can be made small while attaining uniform light distribution properties within an irradiation region of light, by properly designing the shape of a reflection member. The illumination apparatus of the present invention includes a light source and a reflection member which reflects toward an irradiated side a first light flux emerging from the light source and having an emergence angle with respect to an irradiation optical axis which is larger than a predetermined angle. The reflection member reflects a light ray of the first light flux for which the emergence angle is maximal in a direction intersecting with the irradiation optical axis, and satisfies the following condition:

$$\theta 1 < \theta 2$$

where $\theta 1$ and $\theta 2$ are angles defined by, respectively, a first and a second light ray before and after reflection at the reflection surface.

6 Claims, 5 Drawing Sheets

ILLUMINATION APPARATUS AND IMAGE-TAKING APPARATUS

BACKGROUND OF THE INVENTION

1. Field of the Invention

The present invention relates to an illumination apparatus used in an image-taking apparatus or the like.

2. Description of Related Art

Conventional illumination apparatuses used in an image-taking apparatus such as a camera are made of a light source and an optical component, such as a reflector or a Fresnel lens, which guides light flux emitted from the light source to a frontward direction (toward the object).

Various such illumination apparatuses have been proposed, in which light emerging from the light source in various directions is condensed to the necessary illumination angle within little space and with high efficiency.

In particular in recent years, illumination apparatuses have been proposed in which, instead of arranging a Fresnel lens to the front (on the object side) of the light source, a higher condensing efficiency and greater compactness is achieved by arranging an optical member utilizing total reflection, such as a prism or a light guide.

For example, Japanese Patent Applications Laid-Open No. 2000-250102 and 2003-287792 propose illumination apparatuses having a light source and an optical prism for irradiating light flux emitted from the light source toward the irradiated side. In this apparatus, the optical prism has a first incident surface on which the light flux from the light source that emerges near an irradiation optical axis is incident, an emerging surface from which the light flux from the first incident surface emerges, a second incident surface on which some of the light flux from the light source emerging at a larger angle than the light flux near the irradiation optical axis is incident, and a reflection surface which slants the light flux from the second incident surface and lets it emerge from the emerging surface. These surfaces are configured to have such surface shapes that there is a constant correlation between the angle defined by irradiation optical axis and the light flux emitted from the light source center, and the emergence angle with respect to the irradiation optical axis after the light flux has passed through the emerging surface.

Here, in view of mold ability and cost, an optical resin material such as an acrylic resin is usually used as the material of the optical prism.

However, in this type of illumination apparatus, a large amount of heat develops when light is emitted from the light source. With regard to the influence of this heat, the optical material needs to be selected and a heat dissipation space needs to be set in consideration of the thermal energy for one emission of light and the minimal light emission period.

Consequently, in the illumination apparatus proposed in Japanese Patent Applications Laid-Open No. 2000-250102, a certain distance between the light source and the second incident surface needs to be ensured in the optical prism irradiating the light flux from the light source toward the irradiation side, and it was difficult to make the optical prism smaller in the height direction.

SUMMARY OF THE INVENTION

It is an object of the present invention to provide a smaller illumination apparatus while attaining uniform light distribution properties a light irradiation region, by properly designing the shape of a reflection member (reflection mirror) used by the illumination apparatus.

In order to attain this object, an illumination apparatus in accordance with one aspect of the present invention comprises a light source and a reflection member which reflects toward an irradiated side a first light flux emerging from the light source and having an emergence angle with respect to an irradiation optical axis which is larger than a predetermined angle. The reflection member reflects a light ray of the first light flux for which the emergence angle is maximal in a direction intersecting with the irradiation optical axis, and the reflection member satisfies the following condition:

$$\theta 1 < \theta 2$$

where $\theta 1$ and $\theta 2$ are angles defined by, respectively, a first and a second light ray before and after reflection at the reflection member, the first light ray being a light ray of the first light flux whose emergence angle is a first emergence angle, and the second light ray being a light ray of the first light flux whose emergence angle is a second emergence angle that is smaller than the first emergence angle.

These and further objects and features of the illumination apparatus and the image-taking apparatus according to the present invention will become apparent from the following detailed description of preferred embodiments thereof taken in conjunction with the accompanying drawings.

DETAILED DESCRIPTION OF THE PREFERRED EMBODIMENTS

An embodiment of the present invention is described below, with reference to the accompanying drawings.

Figure 1A:
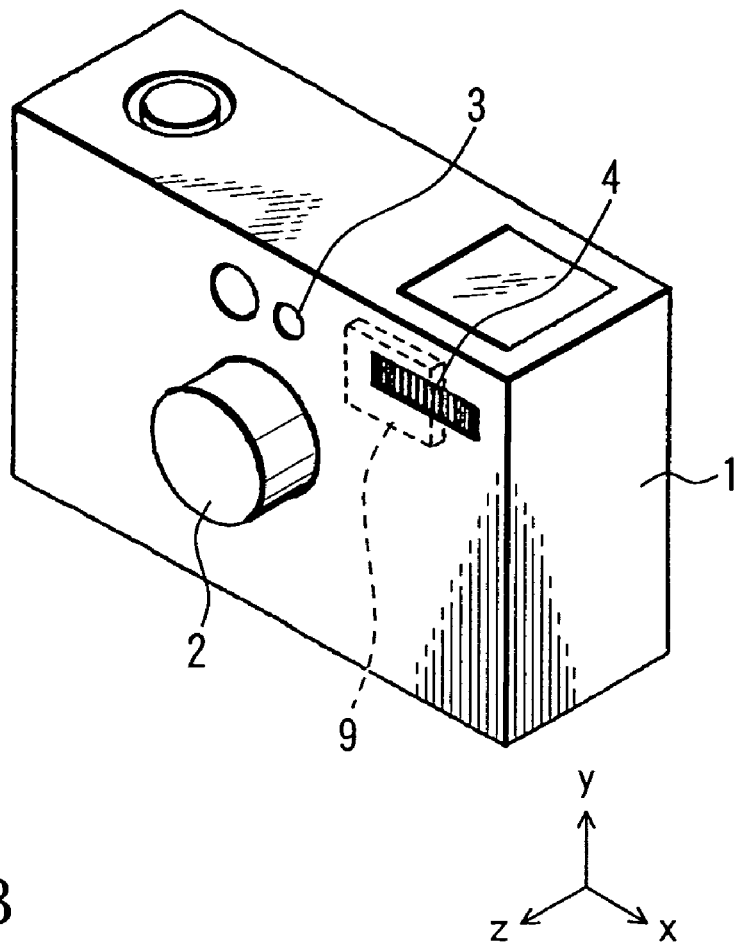
FIGS. 1A and 1B are diagrammatic views of cameras equipped with an illumination apparatus according to an embodiment of the present invention.
Figure 1B:
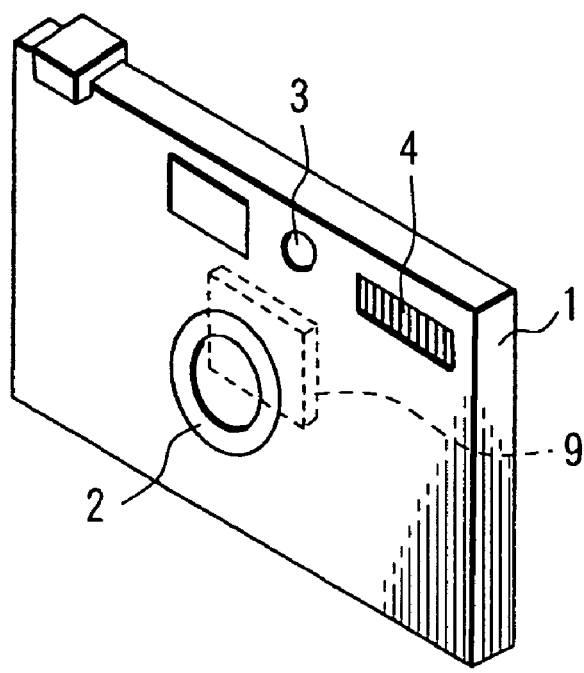

FIGS. 1A and 1B show a compact camera and a credit-card camera (image-taking apparatus) using an illumination apparatus according to an embodiment of the present invention. In these drawings, reference numeral 1 denotes a camera body. Reference numeral 2 denotes a lens barrel section provided at the center in the front face of the camera body 1, holding an image-taking lens (not shown in the drawings). Reference numeral 3 denotes a viewfinder.

Reference numeral 4 denotes an illumination unit (illumination apparatus), which is provided at the upper right corner of the camera body 1 when viewing the camera from the front. Reference numeral 9 denotes an image-pickup element, such as a CCD or CMOS sensor, which is arranged inside the camera body 1, and which takes images by photoelectrically converting an object image (image of an object illuminated by the illumination apparatus) formed by the image-taking lens.

Figure 2:
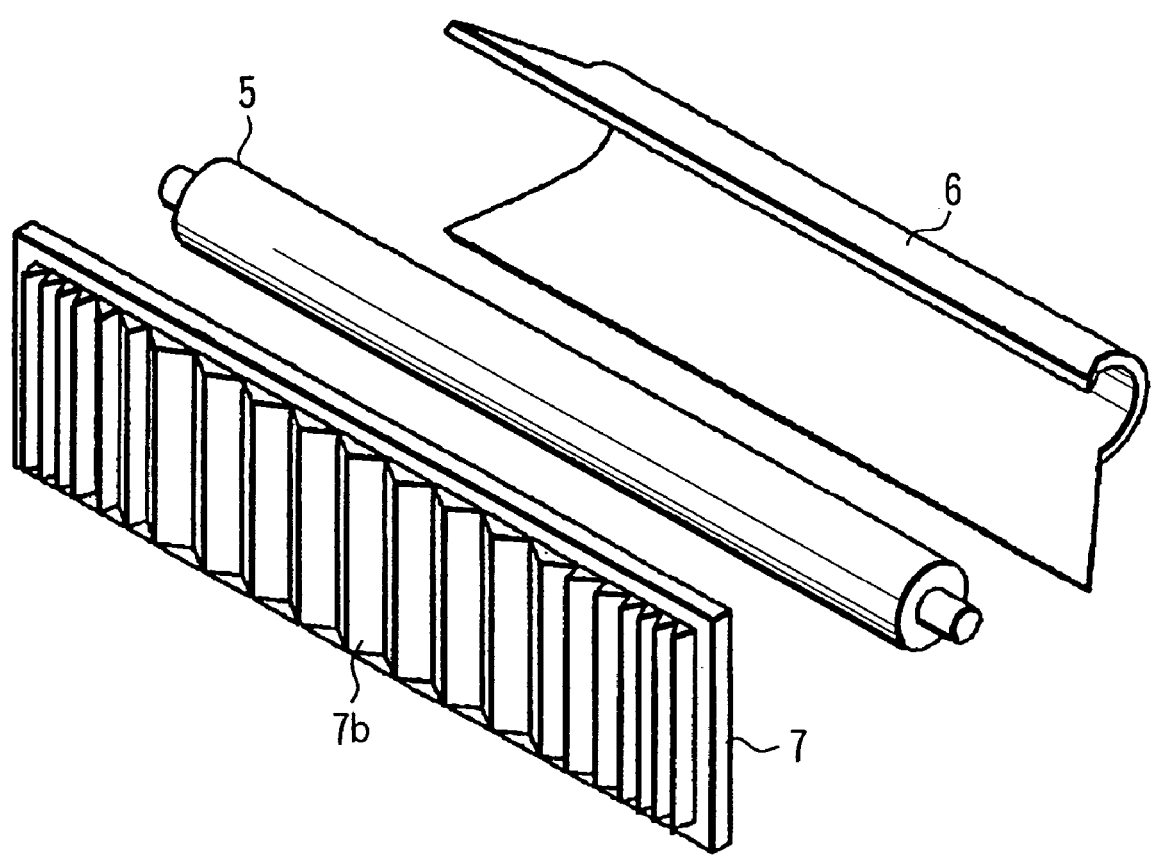
FIG. 2 is an exploded perspective view of an illumination apparatus according to an embodiment of the present invention.

As shown in FIG. 2, the illumination unit 4 includes a cylindrical light-emitting discharge tube 5 serving as a light source, a reflection mirror (reflection member) 6, and an optical member 7. The light-emitting discharge tube 5 emits illumination light. The reflection mirror 6 reflects some of the light emerging from the light-emitting discharge tube 5 toward the object side (irradiated side). The optical member 7 controls the light flux emerging from the light-emitting discharge tube 5 to the object side as well as the light flux reflected by the reflection mirror 6, condensing them into a light flux of a predetermined shape, which is irradiated with high efficiency toward the object side.

Figure 3:
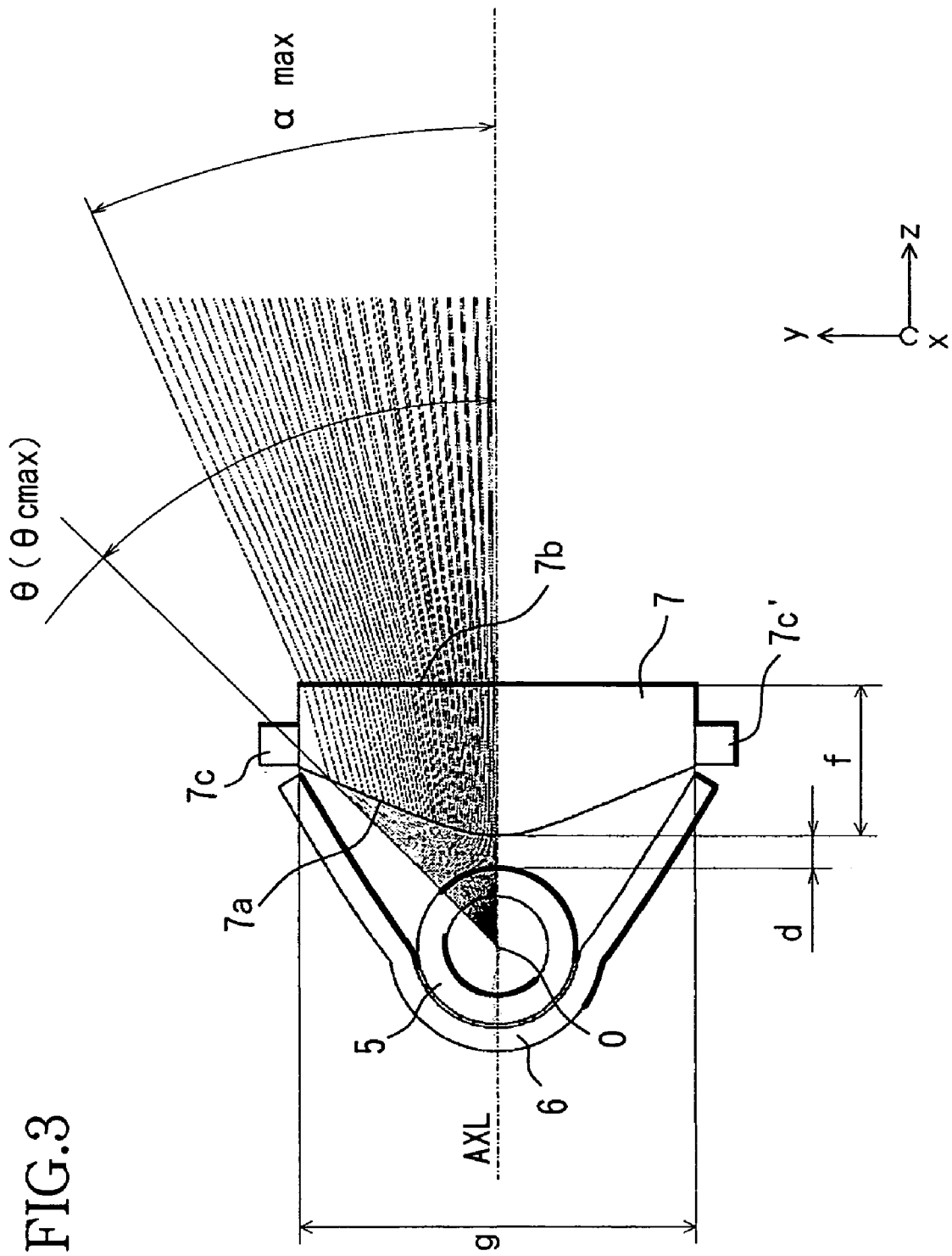
FIG. 3 is a section along the YZ plane and a ray-tracing diagram of the illumination apparatus according to an embodiment of the present invention.

The inner surface of the reflection mirror 6 is made of a metal material, such as bright aluminum, which has a high reflectance. The reflection mirror 6 has a curvature with regard to one direction, and reflects to the object side that part of the light flux emerging from the light-emitting discharge tube 5 that is not emitted to the front (to the object side). The condensing optical member 7 is made of an optical material having high transmissivity, such as optical glass or acrylic resin. A prism surface 7b controlling the light distribution characteristics in lateral direction (X-direction) is formed on the surface on the object side of the optical member 7 (emerging surface). The control of the light distribution characteristics in the vertical direction (Y-direction) is performed by an incident surface 7a as shown in FIG. 3. This incident surface 7a refracts the light flux emerging to the front from the light-emitting discharge tube 5 that emerges close to the irradiation optical axis AXL (second light flux), and converts it into light flux with desired light distribution characteristics. The light flux emerging from the light-emitting discharge tube 5 in vertical direction with respect to the irradiation optical axis AXL (first light flux) is converted by a reflection surface (first reflection portion) 6a of the reflection mirror 6 and the incident surface 7a into light flux having desired light distribution characteristics. The shapes of the reflection mirror 6 and the optical member 7 are explained in more detail below.

Figure 4:
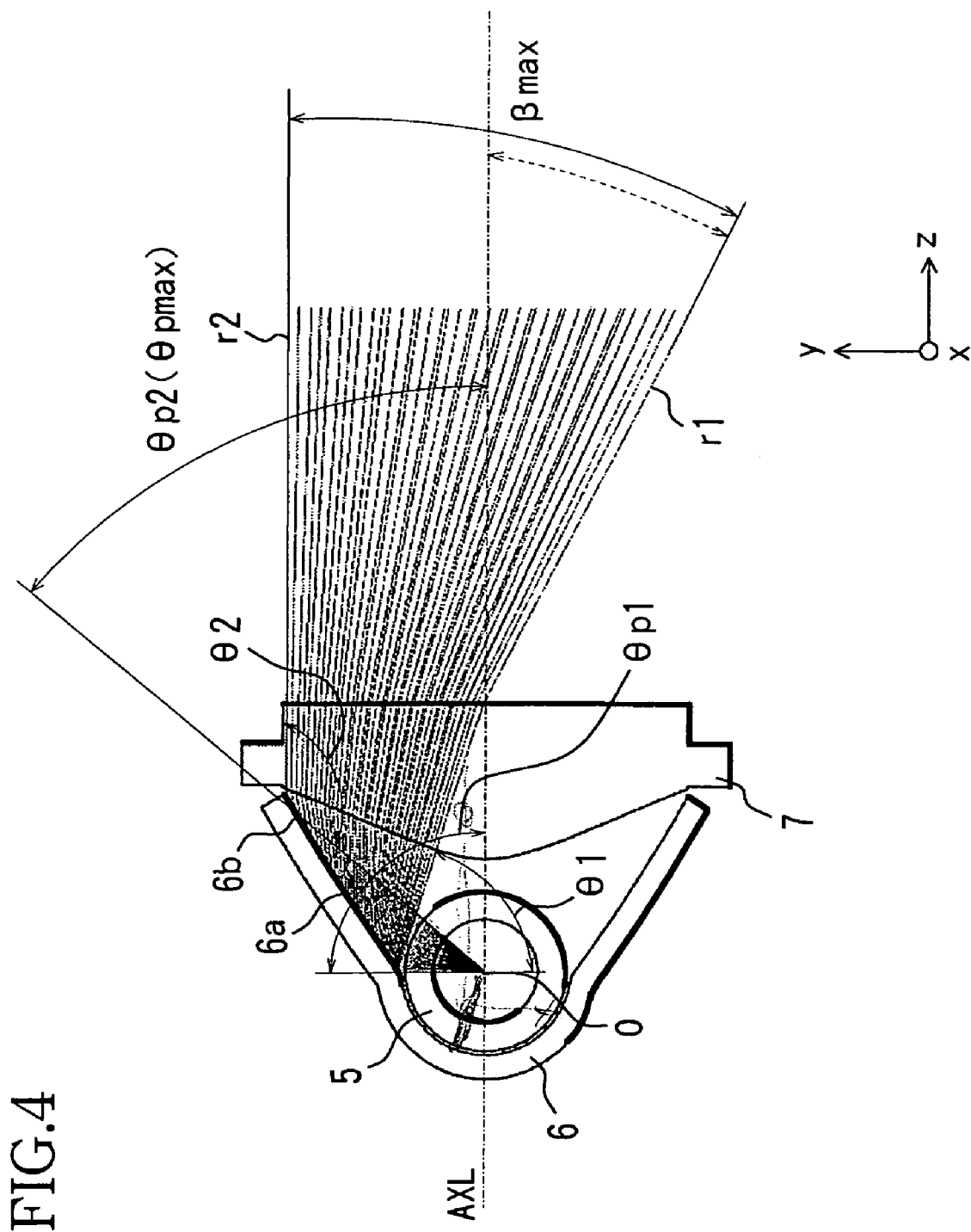
FIG. 4 is a section along the YZ plane and a ray-tracing diagram of the illumination apparatus according to an embodiment of the present invention.

In this embodiment, the shapes of the reflection mirror 6 and the optical member 7 are set in order to attain a miniaturization in the vertical direction (Y-direction), while optimizing the light distribution characteristics in particular in this direction. Referring to FIGS. 3 and 4, the following is a more detailed explanation of a method for setting the optimal shapes of the optical member 7 and the reflection mirror 6.

FIGS. 3 and 4 are longitudinal sectional views in radial direction (X-direction) of the light-emitting discharge tube 5 of the illumination unit 4. It should be noted that FIG. 3 also shows a ray-tracing diagram of the light flux emerging from the center of the light-emitting discharge tube 5 serving as the light source and emerging close to the irradiation optical axis AXL, that is to say, the light flux emerging from the center of the light-emission discharge tube 5 at an emergence angle that is smaller than a predetermined angle with respect to the irradiation optical axis AXL (second light flux), whereas FIG. 4 is a ray-tracing diagram for the light flux emerging at a larger emergence angle than that (first light flux).

In FIGS. 3 and 4, the light-emitting discharge tube 5, the reflection mirror 6, and the optical member 7 are vertically symmetric with respect to the irradiation optical axis AXL. Consequently, also the ray tracing diagrams are vertically symmetric, so that they show only the light flux emerging upward of the irradiation optical axis AXL from the light source center. It should be noted that in FIGS. 3 and 4, apart from the light rays, the configuration and shapes of all optical systems are the same.

The present embodiment is characterized in that the aperture height in vertical direction (Y-direction) can be made smaller, while maintaining the light distribution characteristics in vertical direction constant. The following is an explanation of the characteristics of this shape and of the behavior of the light rays caused thereby.

In FIGS. 3 and 4, the inner and the outer diameter of the light-emitting discharge tube 5 made of glass are shown. During the light emission of an actual light-emitting discharge tube of an illumination apparatus of this type, light is often emitted from the full inner diameter to improve the efficiency, and light can be considered to be emitted substantially uniformly from across the full inner diameter of the light-emitting discharge tube 5.

At the design stage however, in order to control the light emerging from the light-emitting discharge tube 5 with high efficiency, instead of considering the light flux from all across the inner diameter simultaneously, the design may be performed under the assumption that there is an ideal point light source at the light source center O, and then a correction may be made to account for the fact that the light source has a finite size. Also the present embodiment follows this approach, and the light emission center of the light-emitting discharge tube 5 is taken as a reference for determining the shapes of the reflection mirror 6 and the optical member 7.

First, in view of moldability and cost, it is appropriate to use an optical resin material such as acrylic resin as the material of the optical member 7. However, in this kind of illumination apparatus, a large amount of heat is developed when light is emitted from the light source. With regard to the influence of this heat, the optical material needs to be selected and a heat dissipation space needs to be set in consideration of the thermal energy for one emission of light and the minimal light emission period.

Here, the incident surface 7a of the optical member 7 which is positioned closest to the light source is most susceptible to the influence of heat in practice, so the minimum distance between the light source and the incident surface 7a needs to be determined first. In the present embodiment, this interval is set to the minimum distance d, in the direction of the irradiation optical axis AXL, between the light-emerging discharge tube 5 and the incident surface 7a, which controls by direct refraction those components whose emergence angle from the light source center O with respect to the irradiation optical axis AXL is smaller than a predetermined angle (second light flux).

Here, in FIG. 3, when the distance between the incident surface 7a and the light-emitting discharge tube 5 is too large, then the overall optical system becomes large, so that it is preferable that the minimum distance d is in the following range:

$$\phi/10 \leq d \leq \phi/2 \tag{1}$$

where $\phi$ is the diameter of the light-emitting discharge tube 5. Thus, the distance between the incident surface 7a and the light-emitting discharge tube 5 can be kept small within a range in which the influence of the heat from the light-emitting discharge tube 5 does not pose a problem, and miniaturization in the direction of the irradiation optical axis AXL of the optical system can be achieved.

Next, the shape of the incident surface 7a is determined. In the present embodiment, the shape of the incident surface 7a is determined by the following method, in order to attain, with a minimal shape, a uniform light distribution within the necessary irradiation range.

In the present embodiment, the shape of the incidence face 7a is set for the light flux with an angle of emergence from the light source center ○ with respect to the irradiation optical axis that is smaller than a predetermined angle (the second light flux). More specifically, the shape is set such that there is a constant correlation between the emergence angle of the light rays constituting the second light flux and the emergence angle of the light rays after those light rays have passed through the optical member 7.

That is to say, when θ is the emergence angle of the light rays from the light source center ○, and α is the emergence angle of the light rays after refraction and emergence from the optical member 7, then the shape of the incident surface 7a of the optical member 7 is set to a continuous aspherical surface shape that can be expressed by $$\alpha = f(\theta) \quad (2)$$

In the present embodiment, the shape of the incidence face 7a is set such that the above-noted correlation is a proportional relation, in order to attain uniform light distribution characteristics.

That is to say, when θ is the angle between the light rays and the irradiation optical axis AXL at the time of incidence on the incident surface 7a, α is the emergence angle between the light rays and the irradiation optical axis AXL when emerging from the emerging surface 7b, and k is a proportionality constant depending on the necessary irradiation range (angular range), then the shape is set so that the following equation is satisfied:

$$\alpha = k \cdot \theta \quad (3)$$

The following is an explanation of the meaning of Equation (3). Of the light flux that is incident on the incident surface 7a at an angle that is close to the irradiation optical axis AXL (second light flux), those light rays emerging from the light source center ○ that are on the irradiation optical axis AXL pass through the optical member 7 without being refracted. Taking the light ray on the irradiation optical axis AXL as a reference, the light rays emerge from the emerging surface 7b at an emergence angle α, which depends on the emergence angle θ from the light source center ○, that is, at an emergence angle α obtained by multiplying the emergence angle θ from the light source center ○ with (the proportional constant) k.

On the other hand, as shown in FIG. 4, the surface shape of the reflection surface 6a of the reflection mirror 6 is set by the following method, in order to attain, with a minimal shape, a uniform light distribution within the necessary irradiation range.

Presuming that the shape of the incident surface 7a has already been determined by the above-described method, in the present embodiment, the surface shape of the reflection surface 6a is set for the light flux whose emergence angle from the light source center ○ with respect to the irradiation optical axis AXL is larger than the predetermined angle (first light flux). More specifically, the shape is set such that there is a constant correlation between the emergence angle from the light source center ○ of the light rays constituting the first light flux and the emergence angle of the light rays after the light rays have been reflected by the reflection surface 6a and passed through the optical member 7.

That is to say, when θ is the emergence angle of the light rays from the light source center ○, and β is the emergence angle of the light rays after reflection at the reflection surface 6a, refraction at the incident surface 7a and emergence from the optical member 7, then the shape of the reflection surface 6a is set to a continuous aspherical surface shape that can be expressed by $$\beta = g(\theta) \quad (4)$$

In particular in the present embodiment, the shape of the reflection surface 6a is set such that the above-noted correlation is a proportional relation, in order to attain uniform light distribution characteristics.

That is to say, the reflection surface 6a converts the component of the light flux emerging from the light source center ○ and reflected at the reflection surface 6a that has the largest emergence angle θ, that is, the light ray emerging substantially perpendicularly with respect to the irradiation optical axis AXL into a light ray which emerges at the largest angle with respect to the irradiation optical axis AXL, after being reflected by the reflection surface 6a and incident on the incident surface 7a. Moreover, the reflection surface 6a converts the component of the light flux emerging from the light source center ○ and reflected at the reflection surface 6a that has the smallest emergence angle θ, that is, the light ray emitted at substantially the above-noted predetermined angle with respect to the irradiation optical axis AXL into a light ray whose direction is substantially parallel and closest to the irradiation optical axis AXL, after being reflected by the front end portion 6b of the reflection surface 6a and incident on the incident surface 7a. Furthermore, the emergence angle β changes gradually within the region between these light rays, in proportion to the emergence angle θ. The shape of the reflection surface 6a should be set so that the above conditions are satisfied.

Looking at the shape of the reflection surface 6a alone, this shape may be set as follows. As shown in FIG. 4, for the light rays included in the first light flux, that is, the light flux emerging from the light source center ○ and reflected by the reflection surface 6a, when any two light rays emerging from the light source with the emergence angles θp1 and θp2 (<θp1) with respect to the irradiation optical axis AXL are taken to be a first light ray r1 and a second light ray r2 (FIG. 4 shows an example for light rays in which θp1 is maximal and θp2 is minimal), and θ1 and θ2 represent the angles defined by, respectively, the first and the second light ray r1 and r2 before and after reflection at the reflection surface 6a, then the shape of the reflection surface 6a is set such that $$\theta 1 < \theta 2 \quad (5)$$

is satisfied.

Furthermore, in the present embodiment, the condition that the reflected first light ray r1 travels in a direction that intersects the irradiation optical axis AXL is added regarding the shape of the reflection surface 6a. It should be noted that the expression of condition (5) is true for any two light rays included in the first light flux. That is to say, the shape of the reflection surface 6a is determined such that the condition (5) and the above-noted added condition is satisfied for two light rays of any emergence angles.

When furthermore considering the optical member 7, the shape of the reflection surface 6a can be expressed by the following equation:

$$\beta = h \cdot (\theta - \theta emin) \quad (6)$$

where θ represents the emergence angle, with respect to the irradiation optical axis AXL, of a light ray included in the first light flux emitted from the light source center O, and β represents the emergence angle when that light ray emerges from the emerging surface 7b of the optical member 7, and θemin is the emergence angle with respect to the irradiation optical axis AXL of the light ray incident on the front end portion 6b of the reflection surface 6a (i.e. the light ray for which θ2 is minimal), and h is a proportional constant corresponding to the necessary irradiation range (angle).

The light distribution can be controlled very efficiently with the reflection surface 6a whose shape has been determined by the above-described method, if the inner diameter of the light source is sufficiently small and the optical member can be regarded as sufficiently large with respect to the light source.

Considering the actual light distribution properties, however, the size of the inner diameter of the light source (the effective light emission portion) is usually not so small that it can be ignored, and its influence on the overall light distribution properties may be large. That is to say, the finite size of the light source causes a certain widening of the light distribution properties, so that it is necessary to take this factor to a certain degree into account when setting the shape.

Moreover, an even more uniform light distribution can be attained by setting the shape of the surfaces such that the irradiation range of the light flux (second light flux), which is emitted close to the irradiation optical axis AXL and emerges after being subjected to directional control with the optical member 7 substantially coincides with the irradiation range of the light flux (first light flux), which is emitted in vertical direction with respect to the irradiation optical axis AXL and is subjected to directional control by the reflection mirror 6 and the optical member 7.

Consequently, unless a special light distribution is required, in illumination apparatuses for electric flashes provided in cameras, it is preferable that the various values are set such that the following condition is satisfied:

$$0.8 \leq |\beta max/\alpha max| \leq 1.2 \qquad (7)$$

In Condition (7), αmax represents the maximum emergence angle, with respect to the irradiation optical axis AXL, of the light rays included in the light flux emerging from the optical member 7 after being directly incident from the light source center O on the incident surface 7a and refracted by the incident surface 7a (second light flux), and βmax represents the maximum emergence angle, with respect to the irradiation optical axis AXL, of the light rays included in the light flux that is reflected by the reflection surface 6b, refracted by the incident surface 7a and emerges from the optical member 7.

Here, when θcmax is the maximum value of the angles θ formed by the irradiation optical axis AXL and the light rays directly incident from the light source center O on the incident surface 7a and this maximum value θcmax is too small, then it becomes impossible to set the reflection surface 6a. Also, when θcmax becomes too large, then the optical member 7 tends to become bulky. Thus, it is preferable that θcmax is in the following range:

$$30° \leq \theta c\, max \leq 60° \qquad (8)$$

Next, the relation between the emergence angle θ of the light flux from the light source center O and the emergence angles α and β from the emerging surface 7b after directional control with the optical member 7 and the reflection mirror 6 is explained for the shape shown in FIGS. 3 and 4, using specific numerical values.

Let α max be the maximum value of the irradiation angle α of the light flux emerging close to the irradiation optical axis AXL (i.e. at an angle smaller than the predetermined angle) from the light source center O (second light flux) and emerging with uniform light distribution from the emerging surface 7b after being refracted by the incident surface 7a of the optical member 7, and let βmax be the maximum value of the irradiation angle β of the light flux emerging in vertical direction with respect to the irradiation optical axis AXL (i.e. at an angle larger than the predetermined angle) from the light source center O (first light flux) and emerging with uniform light distribution from the emerging surface 7b after being reflected by the reflection surface 6a of the reflection mirror 6 and refracted by the incident surface 7a of the optical member 7. Then, both αmax and βmax are set to 25°. This means, that the necessary light distribution angle of the illumination light in vertical direction of the camera is 50°.

Next, considering the influence of the heat generated when light is emitted, the minimum distance d between the light-emitting discharge tube 5 (outer diameter: φ2.0 mm; inner diameter: φ1.3 mm) and the incident surface 7a of the optical member 7 is set to 0.4 mm.

Moreover, the incident surface 7a is determined such that, for the light flux from the irradiation optical axis AXL to an upward angle of 45°, the maximum value αmax of the necessary irradiation angle becomes αmax=25°. For the conversion of the light ray direction in this case, the Equation (2) between the incidence angle θ and the emergence angle α from the emerging surface 7b holds, and the constant k in this case is:

$$k = \alpha max/\theta = 25.0°/45.0° = 0.556,$$

so that α is given by the general equation:

$$\alpha = 0.556 \cdot \theta \text{ (where } -45.0° \leq \theta \leq 45.0°)$$

Thus, the emergent light flux from the light source is distributed evenly over the emergence angles, when it emerges from the emerging surface 7b of the optical member 7.

As can be seen from the ray-tracing diagram in FIG. 3, the conditions are sufficiently satisfied with regard to attaining uniform light distribution properties, which is one object of this embodiment.

Moreover, as shown in FIG. 3, in view of its use in an actual product, the optical member 7 is provided at its upper and lower ends with a shape making it suitable to be exposed as an externally visible member. That is to say, thin ribs 7c and 7c' are formed in an integrated manner around the entire circumference of an extension of the total reflection surface of the optical prism.

This shape is for positioning with respect to an externally visible member (not shown in the drawings), and prevents that the inner portion becomes visible through a gap between the optical member 7 and the externally visible member. This further prevents trigger leaks of the reflection mirror 6, which is made of metal, with a metal cover used as an exterior component or with conductive members (for example, metal components in the vicinity of the camera) arranged on an extension of the gap between the optical member 7 and the externally visible member.

Ordinarily, in illumination units (illumination apparatuses), a high-voltage trigger signal is applied to the reflection mirror, and this high-voltage trigger signal is applied to the light-emitting discharge tube 5 through a Nesa coating portion of the light-emitting discharge tube which is in contact with the reflection mirror, to start the light emission, but in optical systems that are made compact as in the present embodiment, the distance between the reflection mirror 6 and the exterior component, which is made of metal, or the distance to external conductive objects is short, so that the trigger leak phenomenon tends to occur.

For this reason, by attaching the ribs 7c and 7c' at the extension of the total reflection surface of the optical member 7 as described above, the distance between the reflection mirror 6 and the exterior member or the like can be extended, thus preventing the occurrence of trigger leaks.

In addition to this, the intrusion of dirt or water drops from the outside can also be prevented. In particular water drops may cause shorts between internal high-voltage components and other circuitry, but providing the ribs 7c and 7c' also reduces the possibility for this to happen.

Here, when the material of the optical member 7 is heat resistant acrylic, then its refractive index is about 1.49.

As for the shape of the optical member 7 optimized to the above conditions, the maximum thickness f and the vertical aperture g contributing to the condensing in vertical direction (see FIG. 3) become, respectively, f=1.9 mm and g=5.0 mm, so that the illumination apparatus can be made much smaller than a conventional illumination apparatus.

Next, the shape of the reflection surface 6a of the reflection mirror 6 reflecting the light flux emerging in vertical direction with respect to the irradiation optical axis AXL from the light source center ○ (first light flux) is determined.

Here, as shown in FIG. 4, the maximum angle of the light flux from the light source center ○ that is incident on the incident surface 7a of the optical member 7 is about 47°. It is necessary to leave a gap for dissipation of heat between the optical member 7 and the reflection mirror 6, so that the light flux with the emergence angle $\theta=50°$ from the light source center ○ is made substantially parallel ($\theta=0°$) to the irradiation optical axis AXL. Moreover, the light rays emerging in vertical direction with respect to the irradiation optical axis AXL ($\theta=90°$) are converted to the maximum angle $\beta max=25°$ of the necessary irradiation angle.

Figure 5:
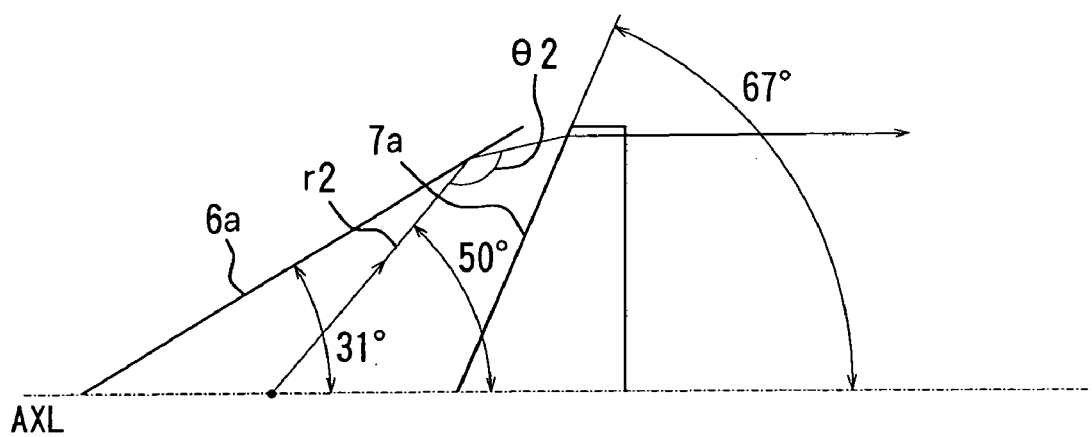
FIG. 5 is a diagram illustrating a method for determining the shape of the illumination apparatus according to an embodiment of the present invention.
Figure 6:
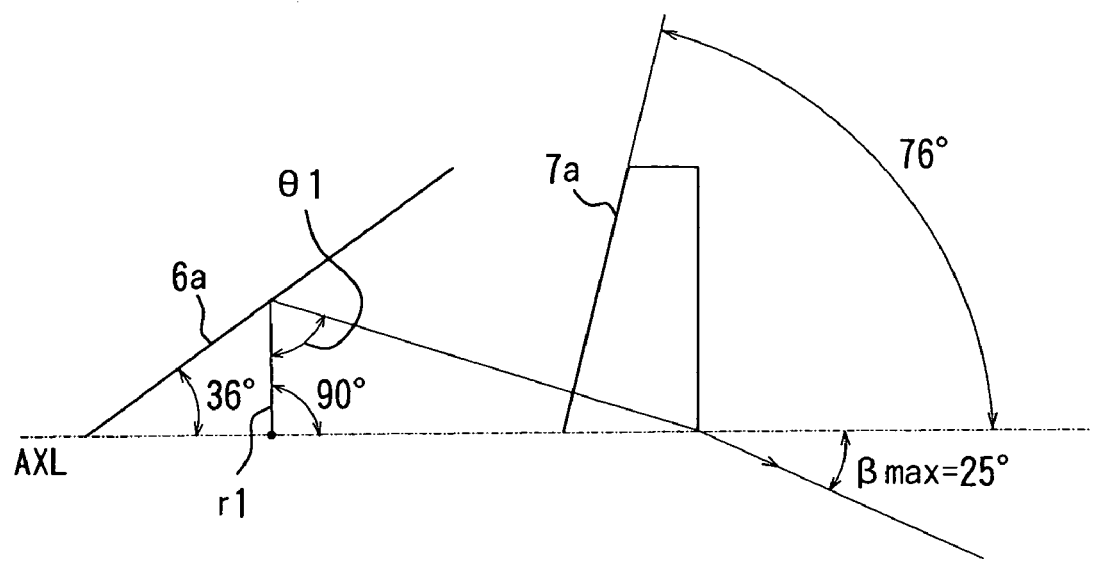
FIG. 6 is a diagram illustrating a method for determining the shape of the illumination apparatus according to an embodiment of the present invention.

This is described in more detail with reference to FIGS. 5 and 6. FIGS. 5 and 6 are ray-tracing diagrams showing, of the first light flux, the light ray with the smallest and the light ray with the largest emergence angle from the light source center ○, respectively.

The light ray r2 emitted at an emergence angle $\theta=50°$ from the light source center ○ (second light ray) is reflected at the front end portion of the reflection surface 6a, is incident on the peripheral portion of the incident surface 7a, and is converted to be substantially parallel ($\theta=0°$) to the irradiation optical axis AXL. Here, since the angle defined by the incident surface 7a and the irradiation optical axis AXL can be measured to be about 67°, this light ray with $\theta=50°$ is caused to emerge substantially parallel ($\theta=0°$) to the irradiation optical axis AXL from the optical member 7 if the tilt of the reflection surface 6a is set to about 31°.

Moreover, the light ray r1 emitted at an emergence angle $\theta=90°$ from the light source center ○ (first light ray) is reflected at the base end portion of the reflection surface 6a, and the tilt of the incident surface 7a near the center of the incident surface 7a where this light ray r1 is incident is presumed to be 76°. As noted above, the incident surface 7a is not a flat oblique surface, but an aspherical surface. If the tilt of the reflection surface 6a is about 36°, then the emergence angle $\beta max$ at which this light ray emerges from the optical member 7 becomes about 25°.

Here, the position at which the light ray emitted in perpendicular direction with respect to the illumination light axis AXL ($\theta=90°$) is reflected by the reflection mirror 6 is positioned such that the reflected light ray does not reenter the glass surface of the light-emitting discharge tube 5. Moreover, the optimum value for the tilt of the incident surface 7a at the position where the reflected light ray is incident on the incident surface 7a can be determined by graphical construction or by simulation for several different tilts, such that the emergence angle $\beta max$ takes on the desired value.

In this case, the tilt of intermediate regions between the base end portion and the front end portion of the reflection surface 6a is set so that the angles between the light rays emerging from the light source center ○ and the irradiation optical axis AXL changes smoothly from 36° to 31°, as noted above.

Consequently, as shown in FIG. 4, the light flux emerging from the light source center ○ and traveling upward with respect to the irradiation optical axis AXL is distributed evenly for the angles of emergence from the light source, and the light flux is caused to emerge uniformly from the emerging surface 7b of the optical member 7 with a density distribution which is different from the distribution of the second light flux emerging at angles close to the irradiation optical axis ALX, as described above.

Moreover, the inner surface of the reflection mirror is made of a metal material, such as bright aluminum, which has a high reflectance. In recent years, in order to improve the reflectance of the reflection surface, materials covered with multi-layer thin film coatings have been used for aluminum mirror-finished reflection surfaces.

Such materials covered with multi-layer thin film coatings have a higher specular reflectance than bright aluminum, but when they are bent at a large curvature by pressing when being shaped into the reflection mirror, cracks form in the coated portion of the surface, and the specular reflectance may decrease compared to that of their planar state.

However, the reflection surface 6a explained in the present embodiment has a small curvature to change the angle (tangential angle) to the irradiation optical axis AXL smoothly from 36° to 31°, so that there is also the advantage that a specular reflectance can be attained which is substantially the same as that of the planar state.

On the other hand, the following is an explanation of the light path of the light flux traveling from the light-emitting discharge tube 5 in rearward direction of the irradiation optical axis (this light path is not shown in the drawings). A reflection surface (second reflection surface) shaped like a semi-circular cylinder concentric with the light source center ○ is formed so that it covers the rear half of the light-emitting discharge tube 5. Moreover, also the glass tube of the light-emitting discharge tube 5 is formed concentric to the light source center ○, so that all of the light flux emerging in rearward direction from the light source center ○ is returned again to the light source center without being refracted by the glass tube. Consequently, the light rays that have returned to the light source center ○ travel along substantially the same light paths as shown in the ray-tracing diagrams of FIGS. 3 and 4, before emerging uniformly on the side of the object.

However, if the light source is assumed to be a point light source, then the above-described shape is preferable, but since the light source actually has a finite size in correspondence to the inner diameter portion of the light-emitting discharge tube, it is possible to attain substantially the same light distribution characteristics even when the shape is not regulated so strictly.

For example, even when using one or a plurality of planar surfaces or circular surfaces, or a quadric surface, such as an ellipsoid, approximating the above-descried shape, substantially the same light distribution properties as with the above-described shape can be attained.

Therefore, the shapes of the incident surface 7a of the optical member 7 and the reflection surface 6a of the reflection mirror 6 of the present embodiment are not limited to shapes which strictly satisfy the above-noted conditions, and it is sufficient if those shapes are shapes that approximately satisfy these conditions.

Moreover, by providing the optical member 7 and the reflection mirror 6 with such approximates shapes, there is the advantage that the measurement whether the actually machined surfaces are in accordance with the design values can be performed much easier than if the surface shapes are aspheric.

It should be noted that the present embodiment was explained for an illumination apparatus used in an illumination unit of a compact camera in particular, but the illumination apparatus of the present invention can also be used for other image-taking apparatuses, such as single-lens reflex cameras or video cameras, and can also be used for a variety of applications other than such image-taking apparatuses.

As explained above, with the present invention, by setting the shape of the reflection member such that it satisfy the above-stated two conditions, it is possible to control the light flux reflected by the reflection member (first light flux) so that uniform light distribution properties can be easily attained, and to contribute to an overall more compact illumination apparatus (in particular to one that is more compact in the direction perpendicular to the irradiation optical axis).

In particular, if an optical member is provided further on the side to be irradiated than the reflection member in order to attain positive refraction (i.e. to condense) the light flux reflected by the reflection member, then it is possible to make the illumination apparatus having this optical member much smaller than a conventional illumination apparatus, by controlling the direction of the light flux incident on this optical member using the reflection member of the present invention.

Consequently, it is possible to achieve smaller size and lighter weight for an image-taking apparatus using this illumination apparatus.

It should be noted that, when $\alpha$max represents the maximum emergence angle, with respect to the irradiation optical axis, of the second light flux emerging from the optical member and $\beta$max represents the maximum emergence angle, with respect to the irradiation optical axis, of the first light flux emerging from the optical member, then the light distribution properties due to the combination of the first and the second light flux can be set easily by ensuring that the following condition is satisfied:

$$0.8 \leq |\beta max/\alpha max| \leq 1.2$$

that is, by setting $\alpha$max and $\beta$max such that they are substantially the same.

Moreover, when $\phi$ is the diameter of the light source and d is the minimal distance between the light source and the incident surface of the optical member, then a miniaturization of the illumination apparatus in the direction of the irradiation optical axis can also be attained by letting the optical member and the light source be as close to one another as possible, so that the following condition is satisfied:

$$\phi/10 \leq d \leq \phi/2$$

While preferred embodiment has been described, it is to be understood that modification and variation of the present invention may be made without departing from the scope of the following claims.

"This application claims priority from Japanese Patent Application No. 2003-415298 filed on Dec. 12, 2003, which is hereby incorporated by reference herein."

What is claimed is:

1. An illumination apparatus, comprising:
   a light source;
   a reflection member which reflects toward an irradiated side a first light flux emerging from the light source and having an emergence angle with respect to an irradiation optical axis which is larger than a predetermined angle; and
   an optical member which positively refracts the first light flux reflected by the reflection member and causes the first light flux to emerge toward the irradiated side,
   wherein the reflection member reflects a light ray of the first light flux, whose emergence angle is maximal, in a direction intersecting with the irradiation optical axis,
   wherein the optical member causes a light ray of the first light flux, whose emergence angle from the light source is smallest and which is reflected by the reflection member, to emerge in a direction that is substantially parallel to the irradiation optical axis by refracting the light ray, and
   the reflection member satisfies the following condition:

$$\theta 1 < 74 \ 2$$

where $\theta 1$ and $\theta 2$ are angles defined by, respectively, a first and a second light ray before and after reflection at the reflection member, the first light ray being a light ray of the first light flux whose emergence angle is a first emergence angle, and the second light ray being a light ray of the first light flux whose emergence angle is a second emergence angle that is smaller than the first emergence angle.

2. The illumination apparatus according to claim 1, wherein the optical member positively refracts also a second light flux whose emergence angle from the light source is smaller than the predetermined angle.

3. The illumination apparatus according to claim 2, wherein the following condition is satisfied:

$$0.8 \leq |\beta \ max/\alpha \ max| 1.2$$

where $\alpha$ max represents the maximum emergence angle, with respect to the irradiation optical axis, of the second light flux emerging from the optical member and $\beta$ max represents the maximum emergence angle, with respect to the irradiation optical axis, of the first light flux emerging from the optical member.

4. The illumination apparatus according to claim 1, wherein the reflection member comprises a first reflection portion reflecting the first light flux and a second reflection portion reflecting, to the irradiated side, a light flux which emerges from the light source in a direction opposite to the irradiated side.

5. The illumination apparatus according to claim 1,
wherein the light source has a shape with a diameter within a plane including the first light flux; and
the following condition is satisfied:

$$\phi/10 \leq d \leq \phi/2$$

where $\phi$ is a diameter of the light source and d is a minimal distance between the light source and an incident surface of the optical member.

6. An image-taking apparatus, comprising:

the illumination apparatus according to claim 1; and an image-pickup element photoelectrically converting an object image illuminated by light flux emerging from the illumination apparatus.

* * * * *

UNITED STATES PATENT AND TRADEMARK OFFICE
CERTIFICATE OF CORRECTION

| | | |
|---|---|---|
| PATENT NO. | : 7,204,601 B2 | Page 1 of 1 |
| APPLICATION NO. | : 11/004447 | |
| DATED | : April 17, 2007 | |
| INVENTOR(S) | : Nobuhisa Kojima | |

It is certified that error appears in the above-identified patent and that said Letters Patent is hereby corrected as shown below:

Column 12, line 39, delete " $\theta_1 < 74\ 2$ " and insert -- $\theta_1 < \theta_2$ --

Signed and Sealed this

Fourth Day of September, 2007

JON W. DUDAS
*Director of the United States Patent and Trademark Office*